US008768336B2

(12) United States Patent
Kilgour

(10) Patent No.: US 8,768,336 B2
(45) Date of Patent: Jul. 1, 2014

(54) COMMUNICATION UNIT AND METHOD FOR FREQUENCY SYNCHRONIZING IN A CELLULAR COMMUNICATION NETWORK

(75) Inventor: Christopher Edward Kilgour, Cambridge (GB)

(73) Assignee: ip.access Limited, Cambourne, Cambridgeshire (GB)

( * ) Notice: Subject to any disclaimer, the term of this patent is extended or adjusted under 35 U.S.C. 154(b) by 419 days.

(21) Appl. No.: 13/263,688

(22) PCT Filed: Mar. 19, 2010

(86) PCT No.: PCT/EP2010/053642
§ 371 (c)(1),
(2), (4) Date: Dec. 20, 2011

(87) PCT Pub. No.: WO2010/115696
PCT Pub. Date: Oct. 14, 2010

(65) Prior Publication Data
US 2012/0094652 A1    Apr. 19, 2012

(30) Foreign Application Priority Data

Apr. 8, 2009   (GB) .................................. 0906110.2

(51) Int. Cl.
*H04W 4/00*   (2009.01)
*H04W 56/00*   (2009.01)

(52) U.S. Cl.
CPC ................................. *H04W 56/0035* (2013.01)
USPC .................. 455/422.1; 455/432.1; 455/435.2; 455/436; 455/439; 455/442

(58) Field of Classification Search
USPC ........... 455/422.1, 432.1, 434, 436, 442, 447, 455/450
See application file for complete search history.

(56) References Cited

U.S. PATENT DOCUMENTS

| 8,274,947 | B1 * | 9/2012 | Fang et al. ..................... 370/331 |
| 2002/0183069 | A1 * | 12/2002 | Myr .............................. 455/456 |
| 2004/0005870 | A1 * | 1/2004 | Yla-Jaaski et al. ........... 455/265 |

(Continued)

FOREIGN PATENT DOCUMENTS

| CN | 1977548 | 6/2007 |
| CN | 1998220 | 7/2007 |

(Continued)

OTHER PUBLICATIONS

International Search Report dated May 31, 2010 for PCT/US2010/053642.

(Continued)

*Primary Examiner* — Dai A Phuong
(74) *Attorney, Agent, or Firm* — Fitch Even Tabin & Flannery LLP

(57) ABSTRACT

A communication unit comprises receiver circuitry for receiving radio frequency (RF) signals from at least one wireless serving communication unit, and a signal processing logic module. The signal processing logic module is arranged to decode system information within received RF signals transmitted by the at least one wireless serving communication unit, determine whether the wireless serving communication unit supports a restricted access communication cell based on the decoded system information, and decide whether RF signals received from that at least one wireless serving communication unit are suitable as a timing signal source when synchronizing an operating frequency of the communication unit based at least partly on the determination.

15 Claims, 4 Drawing Sheets

(56) References Cited

U.S. PATENT DOCUMENTS

| | | | |
|---|---|---|---|
| 2004/0202119 A1* | 10/2004 | Edge | 370/324 |
| 2005/0169408 A1* | 8/2005 | Kim | 375/343 |
| 2008/0085721 A1 | 4/2008 | Hirano et al. | |
| 2009/0042576 A1* | 2/2009 | Mukherjee et al. | 455/436 |
| 2009/0132675 A1* | 5/2009 | Horn et al. | 709/207 |
| 2009/0168727 A1* | 7/2009 | Somasundaram et al. | 370/332 |
| 2010/0240358 A1* | 9/2010 | Jen et al. | 455/424 |
| 2010/0279695 A1* | 11/2010 | Amirijoo et al. | 455/438 |
| 2012/0015681 A1* | 1/2012 | Dalsgaard et al. | 455/517 |

FOREIGN PATENT DOCUMENTS

| | | |
|---|---|---|
| EP | 1983786 | 10/2008 |
| GB | 2441372 | 3/2008 |
| WO | 9809390 | 3/1998 |

OTHER PUBLICATIONS

Great Britain Search Report dated Jun. 16, 2009 for GB0906110.2.
Chinese Patent Application No. 201080025094.8; First Office Action Dated Jan. 30, 2014.

* cited by examiner

COMMUNICATION UNIT AND METHOD FOR FREQUENCY SYNCHRONIZING IN A CELLULAR COMMUNICATION NETWORK

CROSS-REFERENCE TO RELATED APPLIATIONS

This application is a national phase application of International Application No. PCT/EP2010/053642, filed Mar. 19, 2010, designating the United States and claiming priority to Great Britian Application No. 0906110.2, filed Apr. 8, 2009, which are incorporated by reference herein in their entirety.

FIELD OF THE INVENTION

The field of the invention relates to a wireless communication unit and method for frequency synchronising thereof. In particular, the field of the invention relates to a 3GPP wireless communication unit frequency synchronising to macro cell base stations in a combined macro cell/femto cell cellular communication system.

BACKGROUND

Wireless communication systems, such as the $2^{nd}$ Generation (2G) (otherwise referred to as Global System for Mobile (GSM) communications and the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org).

Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more communication cells to which UEs may attach, and thereby connect to the network.

The $3^{rd}$ generation of wireless communications has been developed for macro-cell mobile phone communications. Such macro cells utilise high power base stations (NodeBs in 3GPP parlance) to communicate with UEs operating within a relatively large coverage area.

Lower power (and therefore smaller coverage area) femto-cells or pico-cells are a recent development within the field of wireless cellular communication systems. Femto-cells or pico-cells (with the term femto-cell being used hereafter to encompass pico-cell or similar) are classified under local area base stations and home base stations in the 3GPP standard specifications.

Femto cells are effectively communication coverage areas supported by low power base stations (otherwise referred to as Access Points (APs) or Home NodeBs). These cells are able to be piggy-backed onto the more widely used macro-cellular network and support communications to UEs in a restricted, for example 'in-building', environment. Typical applications for such femto-cell APs include, by way of example, residential and commercial (e.g. office) locations, 'hotspots', etc, whereby an AP can be connected to a core network via, for example, the Internet using a broadband connection or the like. In this manner, femto-cells can be provided in a simple, scalable deployment in specific in-building locations, since the quality of services (voice/data) suffer due to massive attenuation of macro cell transmissions going through concrete walls or metallised glass planes in order to reach the user in-building.

In a femto cell network it is known that there may be a very large number of femto cells compared to the number of macro cells; with femto cells often residing within, or overlapping, macro cells in the same geographic area.

Voltage Controlled Temperature Compensated Crystal Oscillators (VCTCXOs) are known for generating desired (reference) operating frequencies for wireless communication units. Such crystal oscillators have been employed in UE receivers operating in macro cells, and are also considered for use in femto cells. Although VCTCXOs are inexpensive, and therefore an attractive frequency reference component for use by wireless communication unit designers, they are known to suffer from frequency drift from their quiescent operating frequency, which is dependent upon the age of, and any temperature variations affecting, the VCTCXO.

Local oscillator (LO) frequencies for the radio receiver, transmitter and the sampling clocks for baseband data converters (for example analogue-to-digital converters (ADCs) and digital-to-analogue converters (DACs)), are derived from the frequency reference generated by the crystal oscillator. Hence, this frequency drift in the crystal oscillator needs to be carefully controlled; otherwise reference frequency drift will lead to degradation of performance in many aspects of the receiver. Worse still, reference frequency drift may eventually render the receiver incapable of decoding received signals due to frequency drifting outside a receiver 'lock' range. Moreover, from a transmission point of view, a communication unit is not allowed to transmit 3G signals at a frequency error greater than +/−0.1 parts per million, PPM, as per the 3GPP transmitter specifications for local area base stations or +/−0.25 PPM for home base stations.

In macro cell communications, base stations, often referred to as NodeBs, are guaranteed to have high frequency stability, as they employ expensive and, hence, highly stable crystal oscillators. The maximum frequency drift specification of macro cells, according to $3^{rd}$ Generation Partnership Project (3GPP) specifications, is +/−0.05 PPM. Notably, this high accuracy macro cell reference frequency compares favourably to the lower accuracy performance of femto cell VCTCXO crystal oscillators, which are typically in a region of less than +/−10 PPM.

Clearly, it is of paramount importance that a femto cell communication unit receiver is in frequency lock with the most stable, accurate transmitter that it is receiving signals from, in order to correctly decode signals. Furthermore, it is important to achieve this high frequency accuracy before the receiver baseband modem attempts to decode the received channels. A desired frequency accuracy performance before decoding would be to reduce the frequency drift down to between +/−0.1 PPM and +/−0.2 PPM. This process of reducing the frequency drift within the receiver's decoding requirements is termed 'frequency synchronisation'.

Though the frequency accuracy required for decoding is +/−0.1 PPM, the femto cell VCTCXO crystal has to be synchronised to a much greater accuracy. This is because the macro cell to which the femto cell VCTCXO crystal synchronises has a frequency accuracy of +/−0.05 PPM as mentioned before. This leaves the VCTCXO with a remaining accuracy budget of +/−0.05 PPM, out of which +/−0.03 PPM is reserved for variation due to, for example, temperature variations. As a result, the VCTCXO frequency error has to be maintained at a frequency accuracy of within +/−0.02 PPM. This frequency accuracy requirement is termed as 'fine frequency synchronisation'.

Existing state of the art frequency synchronisation procedures, for example those employed within UEs, directly retune the wireless communication unit's hardware VCTCXO crystal to iteratively correct an estimated frequency error, thereby synchronising the VCTCXO crystal to any received RF signal, since it is assumed that the received RF signal originates from a stable reference such as a macro cell. Furthermore, it is known that such frequency synchronisation procedures frequency lock to every received individual base station (e.g. every macro cell NodeB), in turn, in order to select the best frequency to synchronise its operating frequency to.

In femto cells, it is proposed that femto cell access points (APs) incorporate a downlink (DL) receiver radio sub-system, in a similar manner to a UE receiver, in order to wirelessly receive transmissions from other wireless serving communication units, such as NodeBs and other femto cell APs. It is also proposed that a femto cell AP is able to scan for, receive, and decode transmissions from base stations, including macro cells and other femto cells, in a manner that is termed Network Listen (NWL). Network Listen can operate with base stations belonging to the same network as the femto cell AP, with base stations on the same or a different frequency band as the femto cell AP, and with both 2G and 3G base stations.

However, in a typical femto cell environment, it is likely that, in addition to macro cells, there will be many other femto cells in the residential neighbourhood. Hence, it is highly probable that the femto cell's DL receiver could frequency lock with both femto cell and macro cell reference frequency signals. As a result, the accuracy of the reference frequency signals with which the receiver is frequency locked cannot be guaranteed, due to the likelihood of at least some of them originating from a femto cell, as opposed to a macro cell.

In order to obtain an accurate fine frequency estimation from such a likely combination of femto cell and macro cell reference signals, it would be necessary to filter the frequency estimate over a long period of time (typically tens or even hundreds of frames in the case of low signal-to-noise ratio conditions). Such a process would consume most of the available time during a Network Listen process for each cell. Accordingly, it is not desirable that a femto cell DL receiver synchronises to another femto cell AP, since femto cell APs will typically employ inexpensive, and therefore less accurate, VCTCXO crystals.

Thus, there exists a need for a method and apparatus for fine frequency synchronisation in a cellular communication unit, particularly one for a 3GPP femto cell, for example a communication unit using an inexpensive VCTCXO crystal oscillator in a 3GPP combined femto cell/macro cell communication network, which aims to address at least some of the shortcomings of past and present techniques and/or mechanisms.

SUMMARY

Accordingly, the invention seeks to mitigate, alleviate or eliminate one or more of the abovementioned disadvantages singly or in any combination.

According to a first aspect of the application, there is provided a communication unit, for example an access point for supporting a femto communication cell, comprising receiver circuitry for receiving radio frequency (RF) signals from at least one wireless serving communication unit, and a signal processor. The signal processor is arranged to decode system information within received RF signals transmitted by the at least one wireless serving communication unit, determine whether the wireless serving communication unit supports a restricted access (for example a Closed Subscriber Group (CSG)) communication cell based on the decoded system information, and decide whether RF signals received from that at least one wireless serving communication unit are suitable as a timing signal source when synchronizing an operating frequency of the communication unit based at least partly on the determination of whether the at least one wireless serving communication unit supports a restricted access communication cell.

For example, if it is determined that the at least one wireless serving communication unit supports a restricted access communication cell, the signal processor may be arranged to disregard RF signals received from that at least one wireless serving communication unit as a timing signal source when synchronizing an operating frequency of the communication unit. Alternatively, the signal processor may be arranged to apply a synchronization weighting factor to the serving communication unit, from which RF signals are received, based at least partly on the determination of whether the at least one wireless serving communication unit supports a restricted access communication cell.

In this manner, the signal processor is able to differentiate between a reliable timing reference source, such as a non-restricted access macro cell NodeB, and an unreliable timing reference source, such as a restricted access (e.g. CSG) femto cell AP, based on the respective system information, for example as described in greater detail below. Accordingly, the wireless communication unit is able to selectively synchronize and fine frequency lock only with those timing reference sources that are deemed reliable, and therefore suitable.

In one optional embodiment, the signal processor may be arranged to determine whether a wireless serving communication unit supports a restricted access communication cell based at least partly on a restricted access bit, for example a CSG bit, within a system information block broadcast by the wireless serving communication unit.

In one optional embodiment, the signal processor may be arranged to determine whether a wireless serving communication unit supports a restricted access communication cell based at least partly on whether the system information broadcast by the wireless serving communication unit comprises an H(e)NB Name text string.

In one optional embodiment, the signal processor may be arranged to determine whether a wireless serving communication unit supports a restricted access communication cell based at least partly on a physical cell identifier (PCI) value, for example located within a system information block broadcast by the wireless serving communication unit. For example, the signal processor may be arranged to compare a PCI value within a system information block broadcast by the wireless serving communication unit to a range of PCI values reserved for restricted access communication cells, and if the PCI value broadcast by the wireless serving communication unit falls within the range of PCI values reserved for restricted access communication cells, determining that the wireless serving communication unit supports a restricted access communication cell.

In one optional embodiment, if the signal processor determines that the wireless serving communication unit supports a non-restricted access communication cell, the signal processor may be arranged to use the received RF signal of the wireless serving communication unit to correct a frequency drift of a crystal oscillator from which the operating frequency of the wireless communication unit is derived. In particular, if the signal processor determines that the wireless serving communication unit supports a non-restricted access communication cell, the signal processor may be arranged to use the received RF signal of the wireless serving communication unit to update an aggregate frequency error estimation with which to correct a frequency drift of a crystal oscillator from which the operating frequency of the wireless communication unit is derived.

In one optional embodiment, the signal processor may be further arranged, prior to decoding system information from the received RF signal, to perform coarse synchronization with the wireless serving communication unit.

According to a second aspect of the application, there is provided an integrated circuit. The integrated circuit comprises logic for receiving radio frequency (RF) signals from at least one wireless serving communication unit, and logic for decoding system information within received RF signals transmitted by a wireless serving communication unit, logic for determining whether the wireless serving communication unit supports a restricted access (for example a Closed Subscriber Group (CSG)) communication cell based on the decoded system information, and deciding whether RF signals received from that wireless serving communication unit are suitable as a timing signal source when synchronizing an operating frequency of the communication unit, based at least partly on the determination of whether the at least one wireless serving communication unit supports a restricted access communication cell. The integrated circuit further comprises logic for synchronizing an operating frequency of the communication unit to the received RF signal of the wireless serving communication unit if it is decided that RF signals received from that wireless serving communication unit are suitable as a timing signal source when synchronizing an operating frequency of the communication unit.

According to a third aspect of the application, there is provided a wireless communication system adapted to support the communication unit of the first aspect of the application.

According to a fourth aspect of the application, there is provided a method for frequency synchronizing in a wireless communication unit. The method comprises receiving a Radio Frequency (RF) signal from a wireless serving communication unit, decoding system information within the received RF signal, determining whether the wireless serving communication unit supports restricted access (for example a Closed Subscriber Group (CSG)) communication cell based on the decoded system information, and deciding whether RF signals received from that at least one wireless serving communication unit are suitable as a timing signal source when synchronizing an operating frequency of the communication unit, based at least partly on the determination of whether the at least one wireless serving communication unit supports a restricted access communication cell.

According to a fifth aspect of the application, there is provided a computer-readable storage element having computer-readable code stored thereon for programming signal processor to perform a method for frequency synchronizing a wireless communication unit according to the fourth aspect.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS

Embodiments of the invention find particular applicability in a cellular communication system that supports a number of overlapping communication coverage areas, for example a communication system that comprises a combination of femto cells and macro cells. Embodiments of the invention may be used by any communication unit needing to frequency synchronise to another communication unit. For example, embodiments of the invention may be used by user equipment (UE) comprising a wideband code division multiple access (WCDMA) receiver. Embodiments of the invention may be employed particularly by a femto cell receiver operating in a cellular communication system comprising both femto cell base-stations (termed access points (APs) hereafter) and macro-cell NodeBs. In particular, embodiments of the invention enable a femto cell downlink receiver to synchronise to, and use as a timing reference, a macro-cell NodeB's frequency and timing transmissions, whilst substantially disregarding femto cell AP frequency and timing transmissions.

Those skilled in the art, however, will recognize and appreciate that the specifics of this example are merely illustrative of some embodiments, and that the teachings set forth herein are applicable in a variety of alternative settings. For example, since the teachings described hereafter do not depend on a particular cellular communication network conforming to any specific standard, it is envisaged that the teachings and inventive concept described herein can be applied to any type of cellular communication network, although a $3^{rd}$ generation partnership project (3GPP) network is shown in this embodiment. As such, other alternative implementations within cellular communication networks conforming to different standards are contemplated and are considered as being within the scope of the various teachings described.

Figure 1:
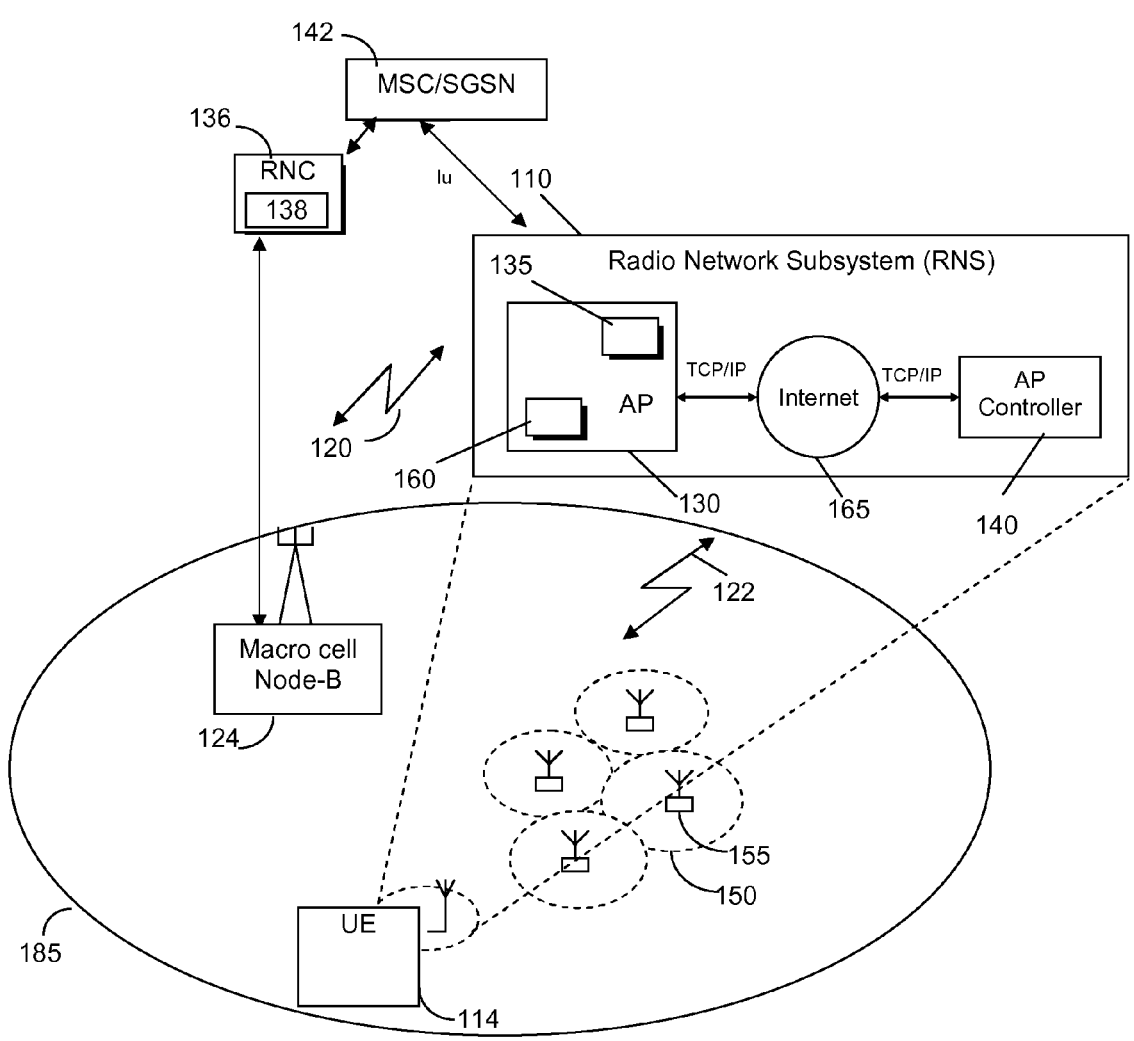
FIG. 1 illustrates an example of a cellular communication system that combines macro-cell and femto-cells, adapted to support frequency synchronisation in accordance with embodiments of the invention.

Referring now to the drawings, and in particular FIG. 1, an example of part of a 3GPP network, adapted in accordance with embodiments of the invention, is illustrated and indicated generally at 100. In FIG. 1, there is illustrated an example of a communication system combining macro cells 185 and femto cells 150 in accordance with one embodiment of the invention. In a femto cell network it is known that there may be a very large number of femto cells per macro cell. Thus, the coverage area of a single macro cell will inevitably encompass a coverage area of a large number of femto cells.

For the embodiment illustrated in FIG. 1, a radio network sub-system (RNS) comprises two distinct architectures to handle the respective macro cell and femto cell communications. In the macro cell scenario, the RNS comprises a radio network controller (RNC) 136 having, inter alia, processing logic module 138 and being operably coupled to a core network (CN) element 142, such as a serving general packet radio system (GPRS) support node (SGSN)/mobile switching centre (MSC), as known.

In a femto cell scenario, an RNS 110 comprises a network element in a form of an Access Point (AP) 130, and a controller in a form of an AP controller 140. As will be appreciated by a skilled artisan, an Access Point (AP) 130 is a communication element that facilitates access to a communication network via a communication cell, such as a femtocell. One application that has resulted in the interest in femto cell technology is that an AP 130 may be purchased by a member of the public and installed in their home. The AP 130 may then be connected to an AP controller 140 over the owner's broadband internet connection 165.

Thus, an AP 130 may be considered, in one embodiment of the invention, as being a scalable, multi-channel, two-way communication device that may be provided within, say, residential and commercial (e.g. office) locations, 'hotspots', etc., to extend or improve upon network coverage within those locations. Although there are no standard criteria for the functional components of an AP, an example of a typical AP for use within a 3GPP system may comprise some Node-B functionality and some aspects of radio network controller (RNC) functionality. The AP communicates with UEs, such as UE 114, via a wireless interface (Uu) 122.

The AP controller 140 may be coupled to the core network (CN) element 142 via an Iu interface, as shown. In this manner, the AP 130 is able to provide voice and data services to a cellular handset, such as UE 114, in a femto cell 150 in contrast to the macro cell 185, in the same way as a conventional Node-B, but with the deployment simplicity of, for example, a Wireless Local Area Network (WLAN) access point.

As mentioned above, in a femto cell network it is known that there may be a very large number of femto cells per macro cell. As a result, the femto AP 130 illustrated in FIG. 1 is likely to have one or more other femto APs 155 within its general vicinity, and in particular is likely to be within range of radio frequency (RF) signals transmitted by those other APs 155.

In macro cell communications, base stations, or NodeB's in 3GPP parlance, are guaranteed to have high frequency stability, as they employ expensive and, hence, highly stable crystal oscillators. Accordingly, it has been proposed that femto cell APs incorporate a downlink (DL) receiver radio sub-system, in a similar manner to a UE receiver, in order to wirelessly receive transmissions from other wireless serving communication units, such as NodeBs, for use as timing references for correcting any frequency drift in their often inexpensive and hence less accurate crystal oscillators.

As outlined above, it is not desirable that a femto cell DL receiver synchronises to another femto cell AP for the purpose of correcting any frequency drift in its crystal oscillator, since those other femto cell APs will typically also employ inexpensive and therefore less accurate VCTCXO crystals, and thus will also suffer from frequency drift.

In accordance with some embodiments of the invention, a communication unit, such as the femto AP 130, comprises receiver circuitry 135 for receiving radio frequency (RF) signals 120 from at least one wireless serving communication unit, such as a macro cell NodeB 124, and signal processing logic module 160. Signal processing logic module 160 is arranged to decode system information within received RF signals transmitted by a wireless serving communication unit, determine whether the wireless serving communication unit supports a restricted access communication cell based on the decoded system information, and decide whether RF signals received from that at least one wireless serving communication unit are suitable as a timing signal source when synchronising an operating frequency of the communication unit based at least partly on the determination of whether the at least one wireless serving communication unit supports a restricted access communication cell. For example, if it is determined that the wireless serving communication unit supports a restricted access communication cell, the signal processing logic module 160 is then arranged to disregard RF signals received from the wireless serving communication unit as a timing source for synchronising an operating frequency of the AP 130.

In the context of embodiments of the invention, the term "restricted access communication cell" encompasses, for example, a communication cell to which a restricted group of one or more subscribers of, for example, a wireless communication network from a totality of possible subscribers is/are permitted access within that network. The 3GPP technical specification for the service requirements for Home NodeBs and Home eNodeBs (TS 22.220) describes an example of an implementation of such restricted access groups in a form of closed subscriber groups (CSGs) proposed for the 3GPP Long Term Evolution (LTE) of UMTS mobile communication system. The use of such restricted access groups enables access to network resources via restricted access cells to be restricted to subscribers who are a member of the relevant group. In particular, since access points for supporting femto cells are typically privately owned and deployed within residential or commercial environments (as opposed to being owned and deployed by a network operator), the 3GPP LTE proposes that all femto cells are implemented as CSG cells in order to enable owners of the respective femto APs to be able to restrict access to services provided by the femto cells to, for example, family/household members in the case of a residential deployment, or employees etc. in the case of a commercial deployment. Thus, within such a wireless communication system, if a cell is not a restricted access cell, then it can be assumed that said non-restricted access cell is a macro cell and therefore RF signals broadcast by the serving communication unit of that cell are a reliable timing signal source for synchronising an operating frequency of a communication unit. In alternative embodiments of the invention, it is envisaged that other restricted group types arrangements may be used in different wireless communication systems.

In this manner, and referring back to FIG. 1, the signal processing logic module 160 is able to differentiate between reliable timing reference sources, such as a non-restricted access macro cell NodeB 124, and potentially unreliable timing reference sources, such as other (restricted access) femto cell APs 155, based on the system information broadcast by the respective wireless serving communication units, for example as described in greater detail below. Accordingly, the wireless communication unit 130 is able to selectively fine synchronise and frequency lock its crystal oscillator to a high accuracy source (typically, better than +/−0.02 PPM) only with those timing reference sources that are deemed reliable, and therefore suitable.

In accordance with some embodiments of the invention, the signal processing logic module 160 of the femto AP 130 may be arranged to determine whether a wireless serving communication unit supports a restricted access communication cell based on a restricted access bit within a system information block, such as a CSG bit within the System Information Block 1 (SIB1) in the case of a 3GPP LTE communication system, broadcast by the wireless serving communication unit. Advantageously, the use of a parameter broadcast within, say, the SIB1 of a 3GPP LTE cell means that the parameter is broadcast every 80 ms, thereby enabling the signal processing logic module 160 to quickly decode such a parameter. If the restricted access (CSG) bit is set, it indicates that the cell within which it is broadcast is a restricted access (CSG) cell, and thus potentially a femto cell. Therefore, RF signals broadcast by the serving communication unit of that cell are potentially an unreliable timing signal source. Conversely, if the restricted access bit is not set, it indicates that the cell within which it is broadcast is a non-restricted access cell. Thus, the cell must be a macro cell, and therefore RF signals broadcast by the serving communication unit of that cell should be able to provide a reliable timing signal source.

In an alternative embodiment of the invention, the signal processing logic module 160 may be arranged to determine whether a wireless serving communication unit supports a restricted access communication cell based on whether the system information broadcast by the wireless serving communication unit comprises an HNB (Home NodeB) Name text string. As specified in 3GPP TS 22.220, HNB Name is a free text format field that a serving communication unit of a 3GPP LTE CSG cell broadcasts to enable a user of a wireless communication unit to identify the cell during a manual CSG identity selection. Thus, if the system information broadcast by a wireless serving communication unit comprises an HNB Name text string, it can be determined that the cell supported by that wireless serving communication unit is a restricted access (CSG) communication cell.

In accordance with some embodiments of the invention, the signal processing logic module 160 may be arranged to determine whether a wireless serving communication unit supports a restricted access communication cell based on a physical cell identifier (PCI) value within a system information block broadcast by the wireless serving communication unit. For example, it is proposed within the 3GPP LTE, and in particular within 3GPP TS 36.300, that a network operator reserves a range (or ranges) of PCI values specifically for use by CSG cells. Furthermore, the PCI of a cell is to be broadcast within each cell, for example within the System Information Block 4 (SIB4) for that cell. In this manner, the signal processing logic module 160 may be arranged to compare a PCI value within a system information block broadcast by the wireless serving communication unit to such a range of PCI values reserved for restricted access (CSG) communication cells. If the PCI value broadcast by the wireless serving communication unit falls within the range of reserved PCI values, it may be determined that the wireless serving communication unit supports a restricted access communication cell.

Whilst three alternative options for determining whether a wireless serving communication unit supports a restricted access communication cell based on decoded system information have been independently described above, it is contemplated that embodiments of the invention may not be limited to the signal processing logic module 160 arranged to use just one of these options, but rather the signal processing logic module 160 may be arranged to utilise any combination of one or more of these techniques for determining whether a wireless serving communication unit supports a restricted access communication cell. Furthermore, it is contemplated that the signal processing logic module 160 may be arranged to utilise one or more of these techniques in combination with other methods for determining good candidate timing signal sources for synchronising an operating frequency of the communication unit.

For example, 3GPP Technical Specification (TS) 25.215 specifies two WCDMA downlink signal quality measures, CPICH EcNo (Common Pilot Channel Energy-per-chip-to-Noise) and CPICH RSCP (Common Pilot CHannel Received Signal Code Power) which may be used as signal quality criteria for determining the suitability of the received RF signal for fine frequency estimation. The CPICH EcNo is defined as the received energy per chip divided by power spectral density measured specifically on the CPICH channel of the received RF WCDMA signal. The reference point for CPICH EcNo is the antenna connector of the femto cell. The CPICH RSCP is defined in 3GPP TS 25.215 as the received power on the CPICH channel after despreading and the reference point of measurement is also the femto cell antenna connector.

For example, CPICH EcNo measured on a received downlink RF signal from the at least one wireless serving communication unit of greater than −20 dB may be considered as a suitable metric for performing fine frequency estimation. Alternatively, a CPICH RSCP measured on a received downlink RF signal from the at least one wireless serving communication unit of greater than −110 dBm is considered as a suitable metric for performing fine frequency estimation.

Thus, and in accordance with some embodiments of the invention, upon determining that a wireless serving communication unit supports a non-restricted access communication cell based on decoded system information, and therefore that the received RF signal from that wireless serving communication unit may be suitable for use as a timing reference signal, the signal processing logic module 160 may be arranged to measure the received RF signal quality of the wireless serving communication unit. Thereafter, the signal processing logic module 160 may perform fine frequency estimation to correct a frequency drift of the crystal oscillator from which the operating frequency of the wireless communication unit is derived, if the signal quality measure, for example CPICH EcNo or CPICH RSCP, is above an operator selected threshold, for example −20 dB or −110 dBm respectively in the above example. In accordance with some embodiments of the invention, the particular criteria, for example EcNo or RSCP, used for determining the quality of the received RF signal and/or the threshold with which the criteria is compared may be configurable.

The signal processing logic module 160 may be additionally arranged, prior to decoding system information from the received RF signal, to perform coarse synchronisation (as opposed to fine synchronisation) with the wireless serving communication unit. In this manner, whilst coarse synchronisation may not be sufficiently accurate for the requirements of a serving wireless communication unit according to the 3GPP specifications, it is sufficiently accurate and time efficient to enable the signal processing logic module 160 to decode the system information. Consequently, the signal processing logic module 160 is able to determine the suitability of an RF signal for use as a timing signal source for fine synchronising an operating frequency of the communication unit. Notably, the coarse frequency synchronisation procedure may be such that the residual frequency error between the communication unit's crystal oscillator and the received RF signal(s) is reduced to within a range that ensures good Rake receiver performance under moderate-to-low signal-to-noise ratio (SNR) environments. For example, an acceptable range of residual frequency error for Rake receiver operation may be between +/−0.2 PPM to +/−0.1 PPM.

In accordance with some embodiments of the invention, if the signal processing logic module 160 determines that the wireless serving communication unit supports a non-restricted access communication cell, and thus that RF signals received from that wireless serving communication unit are potentially suitable as a timing signal source for synchronising an operating frequency of the communication unit, the signal processing logic module 160 may be further arranged to use the received RF signal of the wireless serving communication unit to correct a frequency drift of a crystal oscillator from which the operating frequency of the wireless communication unit is derived.

For example, the signal processing logic module 160 may be arranged to use the received RF signal of the wireless serving communication unit to correct a frequency drift of a crystal oscillator from which the operating frequency of the wireless communication unit is derived. More specifically, the signal processing logic module 160 may be arranged to use the received RF signal as a singular reference with which to synchronise and correct the frequency drift of the crystal oscillator.

Alternatively, it is envisaged that the signal processing logic module 160 may be arranged to use the received RF signal of the wireless serving communication unit to update an aggregate frequency error estimation with which to correct the frequency drift of a crystal oscillator. For example, the signal processing logic module may be arranged to calculate a statistical aggregate (for example an average or median) frequency drift. The signal processing logic module may then adjust (correct) the operating frequency of the crystal oscillator to synchronise to an average or median frequency.

Figure 2:
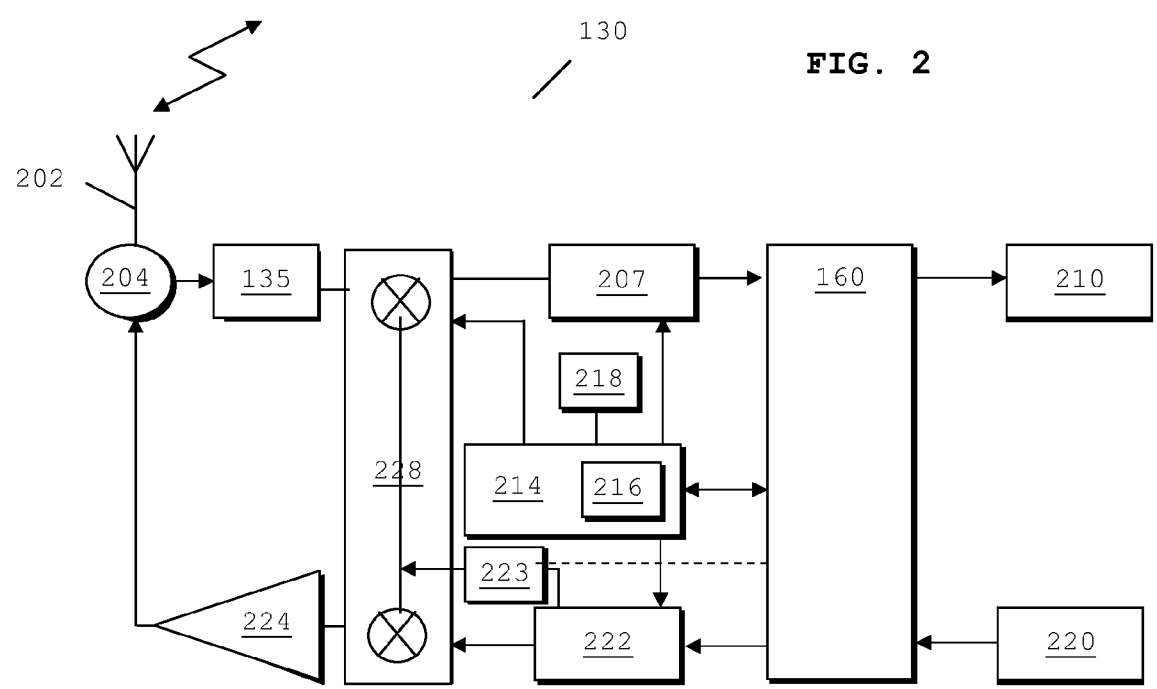
FIG. 2 illustrates an example of a block diagram of part of a femto access point.

Referring to FIG. 2, there is illustrated an example of a block diagram of part of the femto AP 130 of FIG. 1 adapted to support the inventive concept of an example of the invention. The femto AP 130, in the context of the illustrated embodiment of the invention, contains a variety of well known radio frequency components or circuits, which for the illustrated embodiment comprises the receiver circuitry 135 illustrated in FIG. 1. The femto AP 130 contains an antenna 202 preferably coupled to a duplex filter or antenna switch 204 that provides isolation between receive and transmit chains within the femto AP 130. The receiver chain includes receiver front-end circuitry 135 (effectively providing reception, amplification and filtering of a received signal). These circuits are well known in the art, and therefore will not be described in further detail.

The received signal is input to a frequency conversion circuit 228 that receives a reference oscillator signal from the frequency generation circuit 223. The frequency conversion circuit 228 preferably comprises mixing and amplifier elements (not shown), as known in the art. The frequency conversion circuit 228 is serially coupled to signal processing logic 160 (generally realised by a digital signal processor (DSP)) via, say, a baseband (back-end) processing circuit 207. An output from the signal processing logic 160 is provided to, for example, a TCP/IP interface 210, which enables the femto AP 130 to be operably coupled to, say, the Internet 165 of FIG. 1.

A controller 214 is operably coupled to the frequency generation circuit 223 and/or frequency conversion circuit 228. A memory device 216 stores a wide array of femto AP-specific data, for example decoding/encoding functions, frequency and timing information for the femto AP 130, etc. and may be realised in a variety of technologies such as random access memory (RAM) (volatile), (non-volatile) read only memory (ROM), Flash memory or any combination of these or other memory technologies. A timer 218 is operably coupled to the controller 214 to control the timing of operations, namely the transmission or reception of time-dependent signals, within the femto AP 130.

The transmit chain essentially includes an input device 220, coupled in series through a processor 208, transmitter/modulation circuitry 222, frequency generation/conversion circuit 228 and a power amplifier 224. The signal processing logic 160, transmitter/modulation circuitry 222 and the power amplifier 224 are operationally responsive to the controller. An output from the power amplifier is coupled to the duplex filter or antenna switch 204, as known in the art.

In accordance with one example embodiment of the invention, the receiver 165 of the femto AP 130 is arranged to receive an RF signal at a carrier frequency or limited range of carrier frequencies. This carrier frequency may contain a combination of signals from multiple macro cells and femto cells, with the signals located on substantially the same frequency. The radio frequency generation circuit 223 has been adapted to perform coarse synchronisation of, say, a femto AP's crystal oscillator, such that signals from individual cells operating on that carrier frequency are detected.

In one example embodiment, for each detected cell, system information contained within a number of the respective RF signals is decoded, for example using a Rake receiver based decoder. The signal processing logic 160 is then arranged to determine, from the decoded system information, whether the cell to which the RF signal relates is a restricted access communication cell, for example a CSG cell, and thereby whether the RF signal is potentially suitable for use as a timing reference signal.

If the cell to which the RF signal relates comprises a non-restricted access communication cell, the signal processing logic 160 determines whether the transmission from the respective cell comprises a signal quality greater than a particular threshold level. If the signal processing logic 160 determines that the transmission comprises a signal quality greater than the particular threshold level, the signal processing logic 160 assumes that the transmissions from the respective wireless serving communication unit (macro NodeB or femto AP) are suitable for use as a timing reference. Accordingly, the signal processing logic 160 then controls the operation of the frequency generation circuit 223 to perform fine synchronising of the operating frequency of the femto AP's crystal oscillator to the desired received RF signal, for example to a high accuracy of better than 0.02 PPM.

Fine frequency synchronisation may be obtained via coarse synchronisation by the receiving femto AP 130 in a number of ways, as is known in the art. One example embodiment in the case of WCDMA implementations is a progressive refinement in three stages. For example, a first stage comprises correlation of a known regular short-duration synchronisation signal within the received signal, for example the Primary Synchronisation Channel (P-SCH), with a corresponding version of the signal that is generated from data stored within the femto AP 130. Any phase offset detected in the output of the correlation allows correction of the receiver frequency down to an accuracy of few kilohertz (kHz), sufficient to read the pilot channel (CPICH).

Following this the receiving femto AP 130 may apply, in a second stage, a similar technique using the Primary CPICH which is broadcast continuously by the serving communication unit and probably at higher power than the P-SCH, thus leading to a much more accurate estimate of frequency error because of the longer period over which to carry out the correlation and the higher signal to noise level. A third stage may make use of output from the Rake receiver in the femto AP 130 to complete the refinement of frequency accuracy down to the fine frequency synchronisation requirement.

However, if the signal processing logic 160 determines that the cell to which the RF signal relates comprises a restricted access communication cell, or the signal quality is not greater than the particular threshold level the signal processing logic 160 may discard that particular RF signal for that cell, at least from the point of view of a timing reference for fine frequency synchronising.

More particularly, the signal processing logic 160 may arrange for the fine frequency synchronisation process to operate only on those cells that are identified as suitable timing references and in addition have a suitable received signal quality measure at the femto AP's antenna 202. For example, the signal quality measure may be the received CPICH EcNo (that is SNR of the Common Pilot Channel in the received signal) or CPICH RSCP (Received Signal Code Power of the CPICH channel in the received signal) from that particular cell. It is envisaged that the chosen signal quality measure and the threshold value(s) that determine a good metric may be dynamically configurable by the Network Operator.

In addition, in the case where more than one suitable timing source satisfies the signal quality measure, the statistical aggregate fine frequency estimate of those cells may be used by the signal processing logic 160.

Of course, the various components within the femto AP 130 may be realised in discrete or integrated component form. Furthermore, it is within the contemplation of the invention that the femto AP 130 may be any wireless communication unit, such as a portable phone, a portable or mobile radio, a personal digital assistant, a wireless laptop computer, etc.

Figure 3:
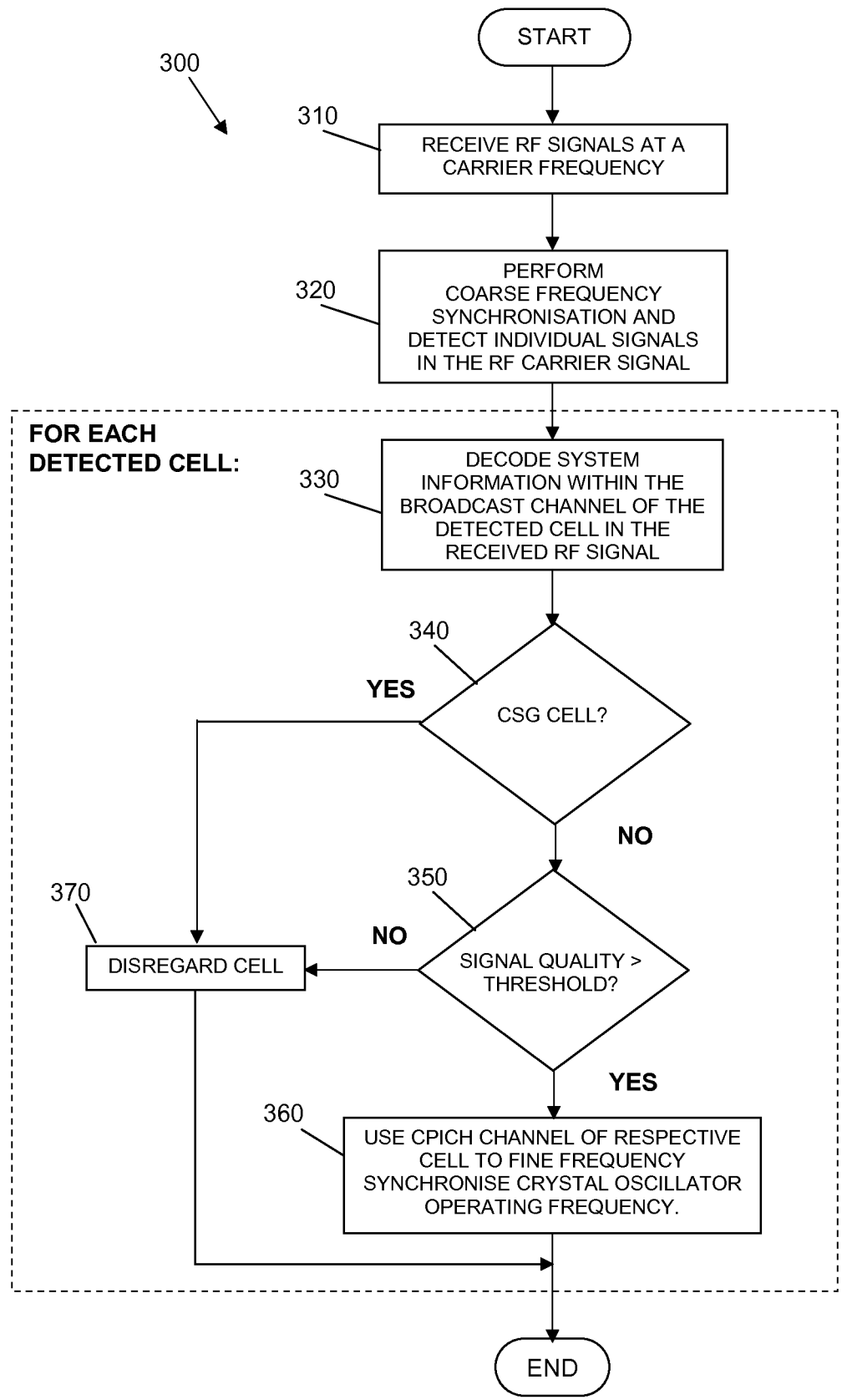
FIG. 3 illustrates an example of a simplified flowchart of a method for frequency synchronising a wireless communication unit according to some embodiments of the invention.

Referring now to FIG. 3, there is illustrated an example of a simplified flowchart 300 of a method for frequency synchronising a wireless communication unit according to some embodiments of the invention.

The method starts at step 310 with the receiving of an RF signal at a carrier frequency or limited range of carrier frequencies. This carrier frequency may contain a combination of signals from multiple macro cells and femto cells, with the signals located on substantially the same frequency. Next, in Step 320 coarse synchronisation of the wireless communication unit's crystal oscillator is performed, and signals from individual cells in that carrier frequency are detected.

Then, for each detected cell, the method comprises the following. In step 330, system information within the respective RF signal is decoded, for example using a Rake receiver based decoder. The method then moves on to step 340, with determining from the decoded system information whether the cell to which the RF signal relates is a restricted access communication cell, for example a CSG cell, and thereby whether the RF signal is potentially suitable for use as a timing reference signal.

If the cell to which the RF signal relates comprises a non-restricted access communication cell, in step 340, the method moves on to step 350, which comprises determining whether the transmission from the respective cell comprises a signal quality greater than a particular threshold level. If the transmission comprises a signal quality greater than the particular threshold level, it is determined that the transmissions from the respective wireless serving communication unit are suitable for use as a timing reference. Accordingly, the method moves on to step 360, which comprises fine synchronising the operating frequency of the wireless communication unit's crystal oscillator to the received RF signal, for example to a high accuracy of better than 0.02 PPM. The method then ends.

Referring back to steps 340 and 350, if the cell to which the RF signal relates comprises a restricted access communication cell in step 340, or the signal quality is not greater than the particular threshold level in step 350, the method moves to step 370, and the RF signal for that cell is disregarded from the point of view of a timing reference for fine synchronising the operating frequency of the wireless communication unit.

More particularly, the fine frequency synchronisation process is operated only on those cells that are identified as suitable timing references and in addition have a suitable received signal quality measure at the communication unit's antenna. For example, the signal quality measure may be the received CPICH EcNo (that is SNR of the Common Pilot Channel in the received signal) or CPICH RSCP (Received Signal Code Power of the CPICH channel in the received signal) from that particular cell. It is envisaged that, the chosen signal quality measure and their threshold values that determine a good metric may be configurable by the operator.

In addition, in the case where more than one suitable timing source satisfies the signal quality measure, the statistical aggregate fine frequency estimate of those cells may be used.

As will be appreciated by a skilled artisan, in a worst case scenario for known approaches currently adopted, a femto cell downlink receiver may be configured by the Network Operator to perform a Network Listen scan of the whole of the regional 3GPP DL frequency bands (e.g. 2.11 GHz to 2.17 GHz and TDD bands in Europe) for potential macro/femto cells. In which case, fine frequency synchronisation may be initially performed to each detected macro/femto cell to an accuracy of better than +/−0.02 PPM. Thereafter, the synchronising wireless communication unit may discard the frequency error estimation result if it is determined from the decoded primary CPICH transmit power information to be an AP of a neighbouring femto cell. The above process is then repeated for each of the detected cells in turn. This is very time consuming and unnecessary from a rake receiver decoder point of view.

A more time optimum method, according to some embodiments of the invention, is to initially coarse synchronise with each detected wireless serving communication unit, such coarse synchronisation being sufficient to be able to operate the rake receiver based decoder (that is to a frequency synchronisation accuracy of around +/−0.2 PPM to +/−0.1 PPM). Once the coarse synchronisation and rake decoding has been performed, embodiments of the invention determine from the decoded primary CPICH transmit power information whether the RF signal is from a (non-restricted access) macro cell as herein described, and if so, run the fine frequency estimation procedure for, say, 10s of frames to get a high frequency accuracy of better than +/−0.02 PPM, thus preventing the fine frequency procedure running on APs that were determined as unsuitable (restricted access) femto cells. As a result, a time saving of many orders of seconds may be achieved in the case where there are many femto cells and macro cells in the neighbourhood of the femto cell running Network Listen.

For the various examples of embodiments of the invention hereinbefore described, a communication unit has been described wherein, upon determination that a serving communication unit supports a restricted access communication cell, RF signals received from that wireless serving communication unit are disregarded as a suitable timing signal source for synchronising an operating frequency of the communication unit. However, it is contemplated that scenarios may arise where it is necessary, or desirable, for RF signals received from a serving communication unit that supports a restricted access communication cell to be used as such a timing signal source. For example, a communication unit, such as a femto AP, may be located such that only RF signals from serving communication units supporting restricted access communication cells are received with sufficient signal strength for synchronization to be achievable. Some of these serving communication units may comprise suitably accurate internal timing sources, and as such may be suitable for providing a suitable timing reference source, despite the fact that they support restricted access communication cells.

Accordingly, and in accordance with some alternative examples of the invention, the signal processing logic module of a communication unit, for example the signal processing logic module 160 of the femto AP 130 of FIG. 1, may be arranged to apply a synchronization weighting factor to serving communication units from which RF signals are received. This weighting may be based at least partly on a determination of whether such serving communication units support restricted access communication cells. In this manner, such a synchronization weighting factor for a serving communication cell may be used within a deterministic process/algorithm, for example as executed by signal processing logic module 160. The deterministic process/algorithm may be arranged to determine the suitability of RF signals received from a serving communication cell as a timing signal source for synchronising an operating frequency of the communication unit. In this manner, RF signals received from a wireless serving communication unit that supports a restricted access communication cell need not be conclusively disregarded as a suitable timing signal source for synchronising an operating frequency of the communication unit.

It is envisaged that the aforementioned embodiments aim to provide one or more of the following advantages:
 (i) An ability to enable a wireless communication unit to automatically correct frequency drift arising in its crystal oscillator, whilst allowing the use of a low cost crystal oscillator.
 (ii) Enable a femto access point to tune to multiple reference signals and select suitable timing signals to synchronise with. For example, when a femto access point is operating in a combined macro cell/femto cell environment, the femto access point is able to distinguish between macro cell and femto cell transmissions. The femto access point is then able to target only the (non-restricted access) macro cell signals for fine frequency estimation and disregard any received (restricted access) femto cell signals. The DL receiver may also utilise an average frequency signal from the selected (non-restricted access) macro cells to synchronise its internal signals to.
 (iii) The inventive concept only requires supporting functionality to be provided within a femto cell, and thus, does not require supporting functionality to be provided within the core network.

Figure 4:
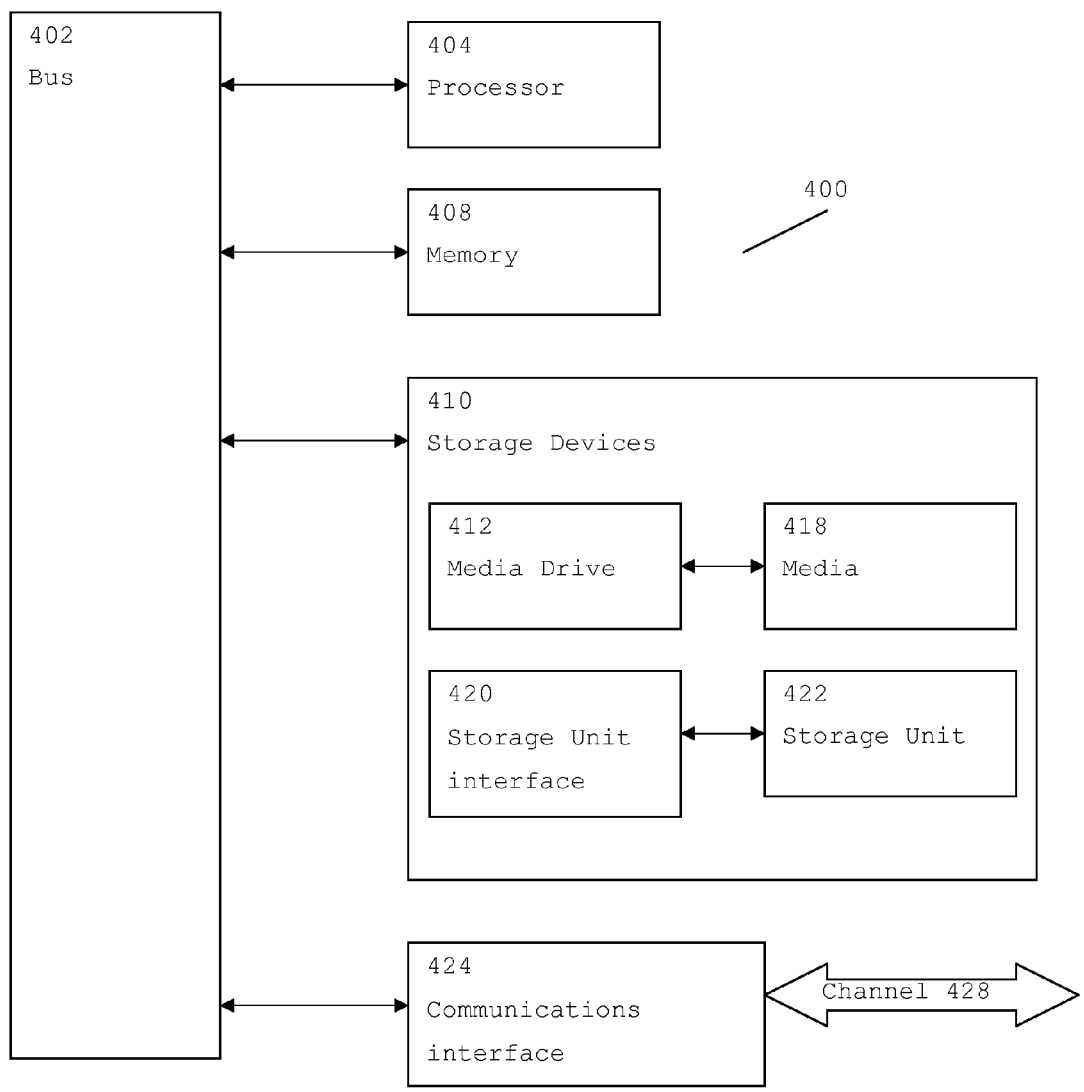
FIG. 4 illustrates a typical computing system that may be employed to implement processing functionality in embodiments of the invention.

FIG. 4 illustrates a typical computing system 400 that may be employed to implement processing functionality in embodiments of the invention. Computing systems of this type may be used in UEs or femto cell downlink receiver (in particular, processing logic module in UE or a femto cell modem that handles frequency synchronisation). Those skilled in the relevant art will also recognize how to implement the invention using other computer systems or architectures. Computing system 400 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 400 can include one or more processors, such as a processor 404. Processor 404 can be implemented using a general or special-purpose processing engine such as, for example, a microprocessor, microcontroller or other control logic module. In this example, processor 404 is connected to a bus 402 or other communications medium.

Computing system 400 can also include a main memory 408, such as random access memory (RAM) or other dynamic memory, for storing information and instructions to be executed by processor 404. Main memory 408 also may be used for storing temporary variables or other intermediate information during execution of instructions to be executed by processor 404. Computing system 400 may likewise include a read only memory (ROM) or other static storage device coupled to bus 402 for storing static information and instructions for processor 404.

The computing system 400 may also include information storage system 410, which may include, for example, a media drive 412 and a removable storage interface 410. The media drive 412 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 418 may include, for example, a hard disk, floppy disk, magnetic tape, optical disk, CD or DVD, or other fixed or removable medium that is read by and written to by media drive 412. As these examples illustrate, the storage media 418 may include a computer-readable storage medium having particular computer software or data stored therein.

In alternative embodiments, information storage system 410 may include other similar components for allowing computer programs or other instructions or data to be loaded into computing system 400. Such components may include, for example, a removable storage unit 412 and an interface 410, such as a program cartridge and cartridge interface, a removable memory (for example, a flash memory or other removable memory module) and memory slot, and other removable storage units 412 and interfaces 410 that allow software and data to be transferred from the removable storage unit 418 to computing system 400.

Computing system 400 can also include a communications interface 414. Communications interface 414 can be used to allow software and data to be transferred between computing system 400 and external devices. Examples of communications interface 414 can include a modem, a network interface (such as an Ethernet or other NIC card), a communications port (such as for example, a universal serial bus (USB) port), a PCMCIA slot and card, etc. Software and data transferred via communications interface 414 are in the form of signals which can be electronic, electromagnetic, and optical or other signals capable of being received by communications interface 414. These signals are provided to communications interface 414 via a channel 418. This channel 418 may carry signals and may be implemented using a wireless medium, wire or cable, fibre optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 408, storage device 418, or storage unit 412. These and other forms of computer-readable media may store one or more instructions for use by processor 404, to cause the processor to perform specified operations. Such instructions, generally referred to as 'computer program code' (which may be grouped in the form of computer programs or other groupings), when executed, enable the computing system 400 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 400 using, for example, removable storage drive 418, drive 412 or communications interface 414. The control logic module (in this example, software instructions or computer program code), when executed by the processor 404, causes the processor 404 to perform the functions of the invention as described herein.

It will be appreciated that, for clarity purposes, the above description has described embodiments of the invention with reference to different functional units or logic module elements or signal processors. However, it will be apparent that any suitable distribution of functionality between different functional units or logic module elements or signal processors, for example with respect to the UE, may be used without detracting from the invention. For example, it is envisaged that functionality illustrated to be performed by separate processors or controllers or logic module elements may be performed by the same processor or controller or logic module element. Hence, references to specific functional or logical units are only to be seen as references to suitable means for providing the described functionality, rather than indicative of a strict logical or physical structure or organization.

Some aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a method and apparatus for performing frequency synchronisation, for example by a femto AP in a cellular communication system that combines macro cells and femto cells, has been described that may alleviate at least some of the shortcomings of past and present techniques and/or mechanisms.

The invention claimed is:

1. A communication unit comprising receiver circuitry for receiving radio frequency (RF) signals from at least one wireless serving communication unit, and a signal processor; the signal processor being arranged to:

decode system information within received RF signals transmitted by the at least one wireless serving communication unit;

determine whether the at least one wireless serving communication unit supports a restricted access communication cell based on the decoded system information; and decide whether RF signals received from the at least one wireless serving communication unit are suitable as a timing signal source when synchronizing an operating frequency of the communication unit based at least partly on the determination; wherein if it is determined that the at least one wireless serving communication unit does not support a restricted access communication cell, utilize RF signals received from the at least one wireless serving communication unit as a timing signal source when synchronizing an operating frequency of the communication unit.

2. The communication unit of claim 1 wherein, if the signal processor determines that the at least one wireless serving communication unit supports a restricted access communication cell, the signal processor is arranged to disregard RF signals received from the at least one wireless serving communication unit as a timing signal source when synchronizing an operating frequency of the communication unit.

3. The communication unit of claim 1 wherein the signal processor is arranged to apply a synchronization weighting factor to the wireless serving communication unit from which RF signals are received based at least partly on determination.

4. The communication unit of claim 1 wherein the signal processor is arranged to determine whether the at least one wireless serving communication unit supports a restricted access communication cell based at least partly on a restricted access bit within a system information block broadcast by the at least one wireless serving communication unit.

5. The communication unit of claim 1 wherein the signal processor is arranged to determine whether the at least one wireless serving communication unit supports a restricted access communication cell based at least partly on whether the system information broadcast by the at least one wireless serving communication unit comprises at least one of: an H(e)NB Name text string and a physical cell identifier (PCI) value.

6. The communication unit of claim 5 wherein the signal processor is arranged to compare the PCI value within a system information block broadcast by the at least one wireless serving communication unit to a range of PCI values reserved for restricted access communication cells, and if the PCI value broadcast by the at least one wireless serving communication unit falls within the range of PCI values reserved for the restricted access communication cells, determining that the at least one wireless serving communication unit supports a restricted access communication cell.

7. The communication unit of claim 1 wherein, if the signal processor determines that the at least one wireless serving communication unit supports a non-restricted access communication cell, the signal processor is arranged to use the received RF signal of the at least one wireless serving communication unit to correct a frequency drift of a crystal oscillator from which the operating frequency of the communication unit is derived.

8. The communication unit of claim 7 wherein, if the signal processor determines that the at least one wireless serving communication unit supports a non-restricted access communication cell, the signal processor is arranged to use the received RF signal of the at least one wireless serving communication unit to update an aggregate frequency error estimation with which to correct the frequency drift of the crystal oscillator from which the operating frequency of the communication unit is derived.

9. The communication unit of claim 1 wherein the signal processor is further arranged, prior to decoding system information from the received RF signal, to perform coarse synchronization with the at least one wireless serving communication unit.

10. The communication unit of claim 1 wherein the communication unit comprises an access point for supporting a femto communication cell.

11. An integrated circuit comprising a signal processor arranged to:
  receive radio frequency (RF) signals from at least one wireless serving communication unit;
  decode system information within received RF signals transmitted by the at least one wireless serving communication unit;
  determine from the decoded system information as to whether the wireless serving communication unit supports a restricted access communication cell;
  decide whether the RF signals received from the wireless serving communication unit are suitable as a timing signal source when synchronizing an operating frequency of the communication unit based at least partly on the determination;
  synchronize the operating frequency of the communication unit to the received RF signal of the at least one wireless serving communication unit if it is decided that RF signals received from the wireless serving communication unit are suitable as a timing signal source; and
  if it is determined that the at least one wireless serving communication unit does not support a restricted access communication cell, utilize RF signals received from the at least one wireless serving communication unit as a timing signal source when synchronizing an operating frequency of the communication unit.

12. A wireless communication system comprising a communication unit comprising receiver circuitry for receiving radio frequency (RF) signals from at least one wireless serving communication unit, and a signal processor; the signal processor arranged to:
  decode system information within received RF signals transmitted by the at least one wireless serving communication unit;
  determine whether the at least one wireless serving communication unit supports a restricted access communication cell based on decoded system information;
  decide whether the RF signals received from the at least one wireless serving communication unit are suitable as a timing signal source when synchronizing an operating frequency of the communication unit based at least partly on the determination; and
  upon determining that the at least one wireless serving communication unit does not support a restricted access communication cell, utilize RF signals received from the at least one wireless serving communication unit as a timing signal source when synchronizing an operating frequency of the communication unit.

13. A method for frequency synchronizing a wireless communication unit, the method comprising:
  receiving a Radio Frequency (RF) signal from at least one wireless serving communication unit;
  decoding system information within the received RF signal;
  determining whether the at least one wireless serving communication unit supports a restricted access communication cell based on decoded system information;
  deciding whether the RF signals received from the at least one wireless serving communication unit are suitable as a timing signal source when synchronizing an operating frequency of the communication unit based at least partly on the determination; and
  upon determining that the at least one wireless serving communication unit does not support a restricted access communication cell, utilizing RF signals received from the at least one wireless serving communication unit as a timing signal source when synchronizing an operating frequency of the communication unit.

14. A non-transitory computer-readable storage element having a computer-readable code stored thereon for programming a signal processing logic module to perform frequency synchronizing at least one wireless serving communication unit, the code operable for:
  receiving a Radio Frequency (RF) signal from at least one wireless serving communication unit;
  decoding system information within the received RF signal;
  determining whether the at least one wireless serving communication unit supports a restricted access communication cell based on the decoded system information;
  deciding whether RF signals received from the at least one wireless serving communication unit are suitable as a timing signal source when synchronizing an operating frequency of the communication unit based at least partly on the determination; and
  upon determining that the at least one wireless serving communication unit does not support a restricted access communication cell, utilizing RF signals received from the at least one wireless serving communication unit as a timing signal source when synchronizing an operating frequency of the communication unit.

15. The non-transitory computer-readable storage element of claim 14, wherein the computer-readable storage element comprises at least one of the group consisting of: a hard disk, a CD-ROM, an optical storage device, a magnetic storage device, a Read Only Memory, ROM, a Programmable Read Only Memory, PROM, an Erasable Programmable Read Only Memory EPROM, EPROM, an Electrically Erasable Programmable Read Only Memory, EEPROM, and a Flash memory.

* * * * *

UNITED STATES PATENT AND TRADEMARK OFFICE
CERTIFICATE OF CORRECTION

PATENT NO. : 8,768,336 B2
APPLICATION NO. : 13/263688
DATED : July 1, 2014
INVENTOR(S) : Christopher Edward Kilgour It is certified that error appears in the above-identified patent and that said Letters Patent is hereby corrected as shown below:

IN THE SPECIFICATION:

Column 1, Line 6; Change "APPLIATIONS" to -- APPLICATIONS --; and

Column 1, Line 12; Change "Britian" to -- Britain --.

Signed and Sealed this
Second Day of December, 2014

Michelle K. Lee
*Deputy Director of the United States Patent and Trademark Office*